United States Patent
Kledaras et al.

(10) Patent No.: US 12,493,887 B1
(45) Date of Patent: Dec. 9, 2025

(54) REPURPOSING A TRANSACTION AUTHORIZATION CHANNEL TO PROVIDE FRAUD NOTIFICATIONS

(71) Applicant: Bolt Financial, Inc., San Francisco, CA (US)

(72) Inventors: Pantelis Miltos Kledaras, Saratoga Springs, UT (US); Akshaya Srivatsa, Foster City, CA (US)

(73) Assignee: Bolt Financial, Inc., San Francisco, CA (US)

( * ) Notice: Subject to any disclaimer, the term of this patent is extended or adjusted under 35 U.S.C. 154(b) by 0 days.

(21) Appl. No.: 18/801,046

(22) Filed: Aug. 12, 2024

Related U.S. Application Data

(63) Continuation of application No. 17/591,244, filed on Feb. 2, 2022, now Pat. No. 12,062,049, which is a continuation of application No. 16/357,322, filed on Mar. 18, 2019, now Pat. No. 11,282,084.

(51) Int. Cl.
*G06Q 20/00* (2012.01)
*G06Q 20/40* (2012.01)

(52) U.S. Cl.
CPC ....... *G06Q 20/4016* (2013.01); *G06Q 20/407* (2013.01); *G06Q 20/4093* (2013.01)

(58) Field of Classification Search
CPC ............. G06Q 20/4016; G06Q 20/407; G06Q 20/4093

USPC .................. 705/16, 21, 59; 380/44, 262, 278
See application file for complete search history.

(56) References Cited

U.S. PATENT DOCUMENTS

2012/0290609 A1* 11/2012 Britt ..................... G06Q 20/326
                                                              707/769

* cited by examiner

*Primary Examiner* — Dante Ravetti
(74) *Attorney, Agent, or Firm* — Baker Botts L.L.P.

(57) ABSTRACT

A method for sending a notification indicating fraud using a transaction authorization channel is described. Upon performing a fraud analysis on a first transaction previously authorized by an issuer of an account via the transaction authorization channel, a determination that the first transaction has indications of fraud is performed. In response to determining that the first transaction has indications of fraud, a transaction authorization request message for a second transaction is generated to include a billing descriptor field with data representing a notification of fraud on the account. The transaction authorization request message for the second transaction is sent, via the transaction authorization channel, to an electronic device associated with the issuer of the account so that it will modify the account to include a transaction entry for the second transaction that will be recognized as a fraud notification when an account holder of the account views pending transactions.

20 Claims, 12 Drawing Sheets

REPURPOSING A TRANSACTION AUTHORIZATION CHANNEL TO PROVIDE FRAUD NOTIFICATIONS

PRIORITY

This application is a continuation under 35 U.S.C. § 120 of U.S. patent application Ser. No. 17/591,244, filed 2 Feb. 2022, which is a continuation under 35 U.S.C. § 120 of U.S. patent application Ser. No. 16/357,322, filed 18 Mar. 2019, issued as U.S. Pat. No. 11,282,084, the disclosures of each of which are incorporated herein by reference.

TECHNICAL FIELD

One or more embodiments relate to the field of network messaging; and more specifically, to the transmission of fraud notifications using a transaction authorization channel.

BACKGROUND

One prior art technique of sending notifications of fraud to an account holder is to: 1) assume a fraudster provides during a checkout process for a transaction accurate information concerning the account holder, such as account name, address, and phone number; 2) use that information in conjunction with a service (e.g., directory assistance, credit bureau data, and/or third-party data sources) to contact the account holder; and 3) rely on the account holder to contact the issuer. If this information is incorrect, the account holder and issuer may not be notified in a timely manner. In another solution, merchants attempt to contact the issuing institution for the account to inform the issuer of the fraud and rely on the issuer to contact the account holder. In both solutions, it may be that the fraudster is also using other accounts of that account holder to perform fraudulent transactions and the issuers of these other accounts may not be notified until the account holder is notified, and then the account holder then notifies these other issuers. Thus, both solutions can be time-consuming and can result in relatively low rates of contacting account holders and/or issuers. These previous solutions require the use of resources (e.g., computer processing, network bandwidth, and electronic storage, as well as the power consumed by these) to communicate the fraud to the issuing institution and/or account holder. Further, the time required to perform the previous solutions enables a fraudster to perform additional fraudulent transactions, where each fraudulent transaction consumes even more resources (e.g., to process the additional fraudulent transactions and later reversals of these transactions when they are identified as fraudulent to the issuers).

BRIEF DESCRIPTION OF THE DRAWINGS

The following figures use like reference numbers to refer to like elements. Although the following figures depict various exemplary embodiments, alternative embodiments are within the spirit and scope of the appended claims. In the drawings:

DESCRIPTION OF EXAMPLE EMBODIMENTS

Figure 1:
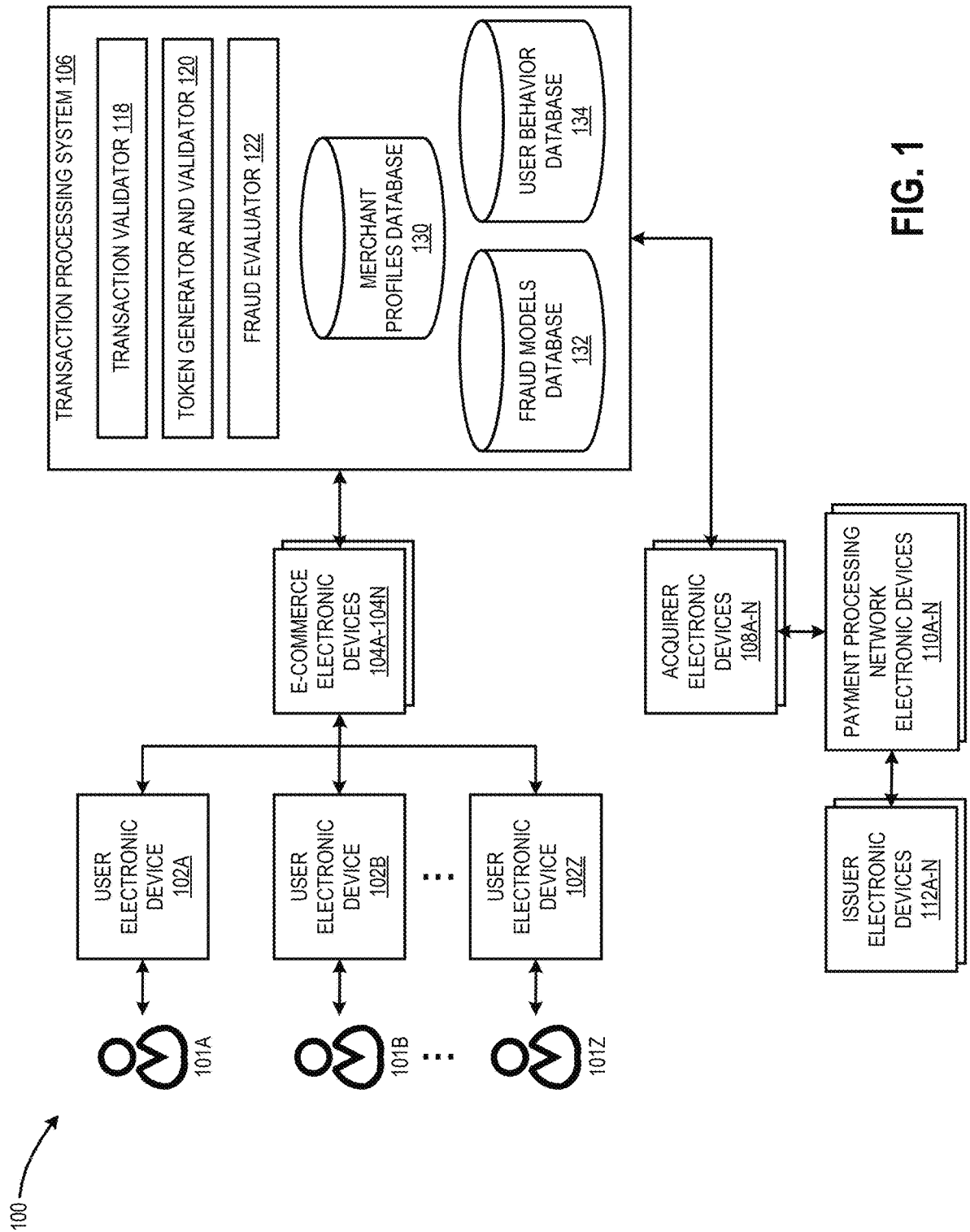
FIG. 1 is a block diagram illustrating the processing of transactions using a transaction processing system according to some example embodiments.

The following description describes the repurposing of a transaction authorization channel to provide a fraud notification. The existing transaction authorization channel provides a mechanism for processing payment transactions and includes the authorization or declination of a payment transaction. According to some exemplary embodiments, a transaction processing system, including one or more electronic devices and software executing on those electronic devices, performs transaction processing and fraud analysis of a first transaction between a user and a merchant that has been previously authorized by an issuer of an account via a first authorization process over a transaction authorization channel. When the transaction processing system determines, from the fraud analysis, that the first transaction has indications of fraud, the transaction processing system generates, as part of a second authorization process being repurposed to perform a fraud notification transaction, an authorization request message that is repurposed to provide a fraud notification. In one embodiment, instead of or in addition to using the billing descriptor of the existing authorization request message format to store data describing the merchant, the transaction processing system repurposes the billing descriptor field of the authorization request message by additionally or alternatively storing in it data (e.g., information, a message, etc.) indicating the determination of fraud on the account. The transaction processing system sends the authorization request message that is repurposed to provide the fraud notification to an issuer electronic device associated with the issuer of the account via a transaction authorization channel. The transaction processing system can use the same transaction authorization channel used to authorize the first transaction during the first authorization process, or use a different transaction authorization channel (e.g., involving a different merchant and/or a different acquirer). Issuers are already configured to respond to authorization request messages by modifying the account of the account holder to include a transaction entry that includes the data from the billing descriptor field. Thus, the issuer, without any modification to its existing system, will respond in the same manner as it normally would respond to authorization request messages. For example, the issuer modifies the account of the account holder to include a transaction entry, but in this case the transaction entry includes the data from the billing descriptor field generated by the transaction processing system that is intended to notify the account holder of the determination of fraud on the first transaction. In some embodiments, the issuer modifies their system to also recognize authorization messages that include notifications of fraud and react accordingly.

Embodiments of the invention provide technical benefits, while also addressing the deficiencies of previous solutions. By initiating a second authorization process repurposed to provide a fraud notification, a transaction processing system automatically performs a process that results in sending a notification of the potentially fraudulent transaction to an account holder and the issuer of the account. Responsive to the notification of the potentially fraudulent transaction: 1) the issuer of the account may respond accordingly; 2) the account holder may contact the issuer of the account (which may help if the issuer's systems are not set up to respond to this form of fraud notification); and/or 3) the account holder may contact the issuers of any other accounts of that account holder that may have been compromised (which may reduce or even eliminate the performance of fraudulent transactions on the other accounts). Further, the fraud notification may be provided relatively quickly and consume relatively little in the way of resources because it may be provided to both the account holder and the issuer as part of the second authorization process, and by repurposing an existing transaction authorization channel. As a result, the issuer(s) can more quickly perform mitigating steps to prevent subsequent fraudulent transactions. Preventing even some fraudulent transactions can result in the conservation of computing and network resources required to process and reverse subsequent fraudulent transactions.

In addition, embodiments of the invention conserve computing and network resources required to perform previous solutions. For example, rather than dedicating resources to inform an account holder and/or an issuer of fraud via a notification made via a secondary communications channel (e.g., calling or messaging the account holder and/or issuer), the transaction processing system repurposes the existing transaction authorization infrastructure to automatically deliver a message to the issuer, and ultimately the account holder, indicating the fraud. Thus, in embodiments of the invention, the existing transaction authorization channels handles not only payment transactions, but also notification transactions.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a transaction processing system, which handles the collection, modification, and processing of transaction data, a tenant may be a merchant or vendor using the transaction processing system to handle messages for processing payments for transactions over the Internet involving products (e.g., deliverables, offerings, goods and/or services, etc.). A user may have one or more roles relative to a system and/or service. To provide some examples, a user may be a representative (sometimes referred to as a "merchant end user," "merchant user," "seller end user," "seller user," "vendor end user," "vendor user) of a tenant (e.g., sometimes referred to as a "merchant," "merchant tenant," "seller," "seller tenant," "vendor," or "vendor tenant"), a representative (e.g., an administrator) of the company providing the system and/or service (sometimes referred to as the transaction processing system company), a customer of a tenant (e.g., a customer (an individual, a company, etc.) buying a product (good and/or service) from the merchant, where the payment processing is done using the transaction processing system of the transaction processing system company, and/or an account holder of an account from an issuing institution (sometimes referred to as the issuer) that may be used to buy products from merchants. A user acting as a customer may and should be the account holder of the account being used to buy a product from a merchant. However, the user acting as the customer may in fact be a fraudster, and thus a different user than the account holder.

FIG. 1 is a block diagram illustrating the processing of transactions using a transaction processing system according to some example embodiments. In one embodiment, system 100 shows the communication of data between the various electronic devices depicted in FIG. 1 for authenticating and/or processing transactions and other interactions. As depicted in FIG. 1, system 100 includes exemplary user electronic devices 102A-102Z, being operated by or otherwise currently associated with users 101A-101Z (also referred to as customers 101A-101Z), respectively. System 100 also includes e-commerce electronic devices 104A-104N. E-commerce electronic devices 104A-104N can include merchant electronic devices and checkout electronic devices. In one embodiment, merchant electronic devices host a plurality of merchant websites. Examples of merchant electronic devices may include a web server computer hosting a merchant website or a merchant application. In one embodiment, a single merchant electronic device manages one or more of the merchant websites or merchant applications. Checkout electronic devices can manage the checkout process for a transaction, for example, by presenting a checkout form, accepting user information (e.g., payment information, shipping information), etc. In one embodiment, transaction processing system 106 manages checkout electronic devices. In one embodiment, a single e-commerce electronic device performs the combined functions of a merchant electronic device and a checkout electronic device.

System 100 also includes transaction processing system 106, acquirer electronic devices 108A-N, payment processing network electronic devices 110A-N, and issuer electronic devices 112A-N.

In one embodiment, the electronic devices depicted in FIG. 1: user electronic devices 102A-Z, e-commerce electronic devices 104A-N, transaction processing system 106, acquirer electronic devices 108A-N, payment processing network electronic devices 110A-N, and/or issuer electronic devices 112A-N are in operative communication with each other across a communications network (e.g., the internet), using any suitable communications protocol as would be understood by one of ordinary skill in the art. By way of example, a user (e.g., user 101A) communicates with a merchant website using a user electronic device (e.g., user electronic device 102A), where the user electronic device accesses the merchant website across a network via a web browser or application operating on the user electronic device. The network may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4$^{th}$ generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system the electronic devices in FIG. 1.

In one embodiment, transaction processing system 106 includes hardware (such as one or more electronic device(s)) and software executing on that hardware. While in one embodiment, transaction processing system 106 is implemented as a multi-tenant architecture having the merchants as tenants, in other embodiments, transaction processing system 106 is implemented as a single-tenant architecture. As illustrated, transaction processing system 106 includes transaction validator 118, token generator and validator 120 and fraud evaluator 122. In addition, transaction processing system 106 includes one or more databases, such as, but not limited to, merchant profiles database 130, fraud models database 132, and user behavior database 134 to facilitate the functioning of transaction processing system 106.

In one embodiment, transaction validator 118 validates transactions received by transaction processing system 106. In one embodiment, transaction validator 118 validates the transaction by checking transaction information (e.g., email address, IP address, phone number, billing/shipping address, etc.) against one or more blacklists. Transaction validator 118 can retrieve blacklists from merchant profiles database 130, fraud models database 132, and/or from external sources. For example, transaction validator 118 can retrieve merchant-specific blacklists from merchant profiles database 130. In another embodiment, transaction validator 118 validates the transactions using an algorithm (e.g., Luhn checksum).

In one embodiment, token generator and validator 120 generates and validates tokens for transactions. In one embodiment, token generator and validator 120 generates tokens in response to receiving a request from e-commerce electronic devices (e.g., 104A-104N), or in response to an indicator that a user/account holder is performing a transaction with a merchant.

In some embodiments, transaction processing system 106 performs fraud evaluations based on transaction information describing transactions between users (e.g., 101A-101Z) and merchant websites or applications. More specifically, in one embodiment, fraud evaluator 122 receives transaction information for transactions between users (e.g., 101A-101Z) and merchant websites, and performs fraud evaluations by applying the transaction information to one or more fraud models. Transaction information can include both user transaction information received from a user (e.g., via user electronic device 102) and merchant transaction information received from a merchant. While in some embodiments the transaction information includes one or more of product information (e.g., product identifier, purchase price, etc.), a merchant identifier, a shipping address, a shipping method, a billing address, and consumer information, alternative embodiments may include more, less, and/or different information.

In one embodiment, fraud evaluator 122 accesses fraud models database 132 to retrieve stored fraud models. While in one embodiment, fraud models database 132 stores fraud models generated by transaction processing system 106, in other embodiments, fraud models database 132 stores fraud models generated by third party sources. In one embodiment, transaction processing system 106 generates the fraud models stored in fraud models database 132 based on evaluations and fraud reviews of previously performed transactions, including both transactions that have indications of fraud and transaction that do not have indications of fraud. In other embodiments, fraud models are trained offline and pushed into transaction processing system 106 and stored in fraud models database 132. In one embodiment, fraud evaluator 122 further accesses user behavior database 134 and applies stored historical user information (e.g., a history of previous transaction associated with account holders of a plurality of accounts, a history of interactions with the website, etc.) and behavior data (e.g., checkout speed, mouse movement, etc.) to the transaction as part of the fraud evaluation.

In one embodiment, merchant profiles database 130 stores merchant profiles. Merchant profiles can include merchant information or merchant-specified configuration information for generating tokens, and merchant identifying information (e.g., name, address(es), merchant category, etc.).

In one embodiment, acquirer electronic devices 108A-N are associated with entities (e.g., a bank) that have relationships with a particular merchant or other entity, such as a merchant account. In one embodiment, acquirer electronic devices 108A-N generate and/or process transaction authorization messages between e-commerce electronic devices 104 and payment processing network electronic devices 110A-N that are received from transaction processing system 106. Similarly, issuer electronic devices 112A-N are typically associated with entities (e.g., a bank) that have relationships with account holders and process authorizations for transactions involving accounts. In one embodiment, issuer electronic devices 112A-N maintain accounts associated with users 101A-Z. For example, issuer electronic devices 112A-N issue accounts and payment devices linked to accounts to users 101A-Z. In embodiments in which transaction processing system 106 handles the transaction processing (e.g., by communicating with acquirer electronic devices 108A-N on behalf of e-commerce electronic devices 104A-104N), transaction processing system 106 has relationships with the entities (e.g., banks) associated with acquirer electronic devices 108A-N.

Payment processing network electronic devices 110A-N can include data processing subsystems, networks, and operations used to support and deliver authorization services, exception file services, and clearing and settlement services. Payment processing network electronic devices 110A-N can transmit authorization request messages and authorization response messages between acquirer electronic devices 108A-N and issuer electronic devices 112A-N. Payment processing network electronic devices 110A-N can facilitate the communication of authorization request messages and authorization response messages to process credit card transactions, debit card transactions, and other types of commercial or business transactions, as well as performs clearing and settlement services, associated with accounts.

System 100 in FIG. 1 includes hardware (a set of one or more electronic devices) and software to provide service(s). The service(s) may be on-demand services that are made available to one or more of the users 101A-Z working for one or more other organizations (sometimes referred to as outside users) so that those organizations do not need to necessarily be concerned with building and/or maintaining a system, but instead makes use of the service(s) when needed (e.g., on the demand of the users 101A-Z). The service(s) may communicate with each other and/or with one or more of the electronic devices via one or more Application Programming Interface(s) (APIs) (e.g., a Representational State Transfer (REST) API).

While FIG. 1 illustrates exemplary embodiments that use various types of electronic devices, alternative embodiments may use more, less, and/or different types of electronic devices. For example, alternative embodiments may combine different ones of the transaction processing system, acquirer, payment processing network, and/or issuer into a same set of one or more electronic devices (e.g., through the use of point of sale terminals, or through the use of virtualization and/or software whose execution performs the operations of more than one of the transaction processing system, acquirer, payment processing network, and/or issuer).

Figure 2:
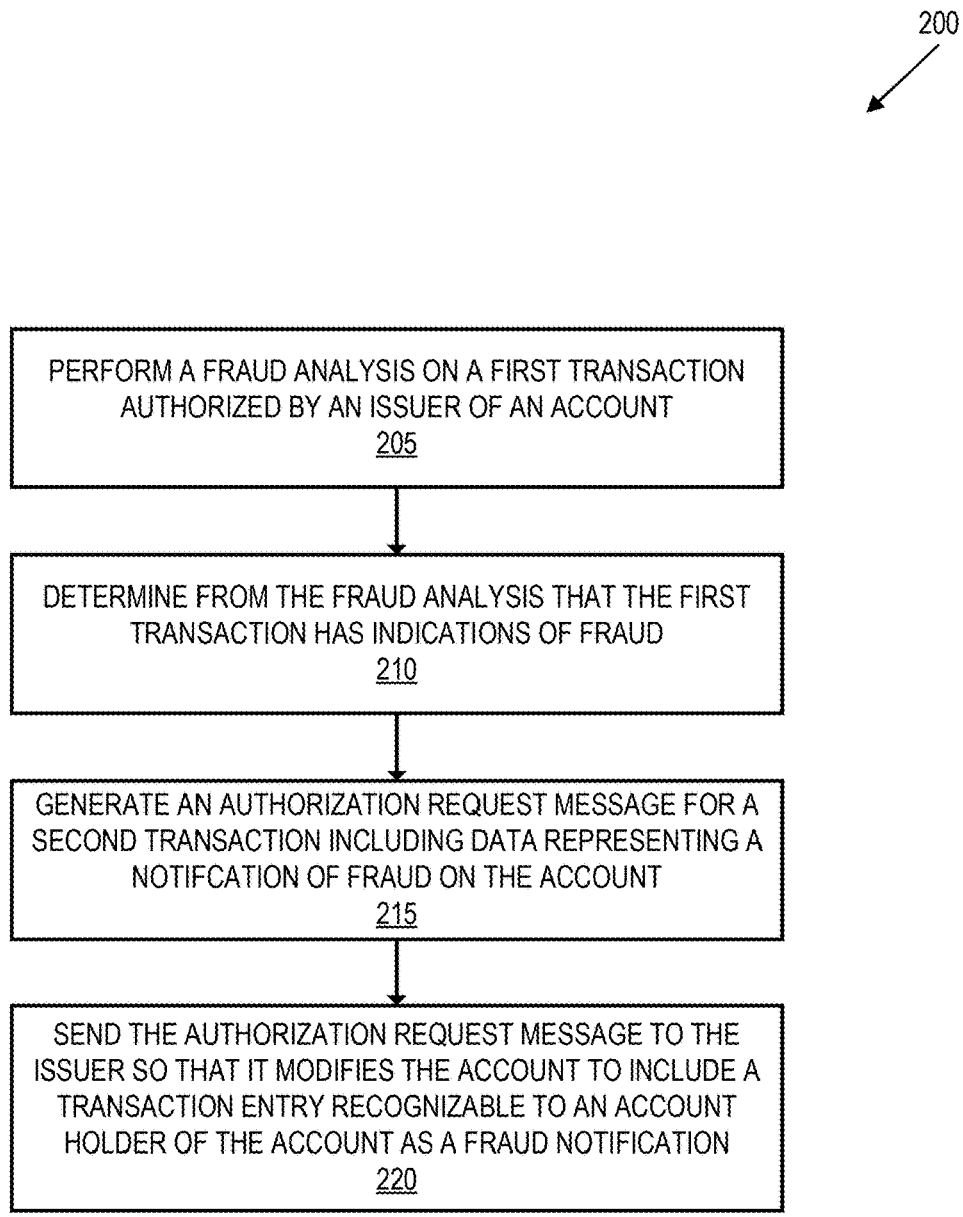
FIG. 2 is a flow diagram that illustrates exemplary operations for repurposing a transaction authorization channel to provide fraud notifications according to some example embodiments.

FIG. 2 is a flow diagram 200 that illustrates exemplary operations for repurposing a transaction authorization channel to provide fraud notifications according to some example embodiments. The operations of FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2.

At operation 205, a transaction processing system 106 performs a fraud analysis on a first transaction between an account holder and a merchant, where the first transaction has been previously authorized by an issuer of an account via a transaction authorization channel. For example, the first transaction may have been previously authorized by the issuer of the account in response to a first transaction authorization request message having transaction information for the first transaction, including a merchant name or merchant identifier in a billing descriptor field and a transaction amount in a transaction amount field of the first transaction authorization request message.

In one embodiment, fraud evaluator 122 of the transaction processing system 106 is configured to access a fraud models database 132 of the transaction processing system 106 storing fraud models and to apply the fraud models to the transaction information of the first transaction. In one embodiment, fraud evaluator 122 further is configured to access user behavior database 134 and apply historical user information and behavior data to the transaction information of the first transaction.

At operation 210, it is determined from the fraud analysis that the first transaction has indications of fraud. With reference to FIG. 1, fraud evaluator 122 determines that the first transaction has indications of fraud based on applying the transactions details to the fraud models. For examples, the fraud models can be used to evaluate a history of previous transactions by the account holder of the account and/or a history of previous transactions by a plurality of account holders of a plurality of accounts (e.g., based on transaction histories stored by user behavior database 134 of transaction processing system 106). In one embodiment, the history of previous transactions by the account holder can include user information (e.g., IP address) and user behavior information (e.g., checkout behavior, how the account holder interacts with the website [typing speed, mouse movements, etc.], etc.). In one embodiment, the history of previous transaction by a plurality of account holders of a plurality of accounts can be determined from users that are similar to the account holder and/or users that have previously performed transactions on the same website.

At operation 215, in response to determining from the fraud analysis that the first transaction has the indications of fraud, a second transaction authorization request message is generated as part of a second transaction and includes data representing a notification of fraud on the account. While in one embodiment this data is placed inside the billing descriptor field, in other embodiments this data may be placed in a different field, multiple fields, etc. While in one embodiment the second transaction authorization request message differs from the first transaction authorization request message in that the billing descriptor field stores the data representing a notification of fraud on the account and not merchant information, in other embodiments, the data representing a notification of fraud on the account is placed in the billing descriptor field in addition to merchant information (e.g., the merchant in the transaction having the indications of fraud). In addition, some embodiments also place a small transaction amount in the transaction amount field of the second transaction authorization request message.

At operation 220, the second transaction authorization request message is sent to an electronic device associated with the issuer (e.g., issuer electronic device 112A) of the account via the transaction authorization channel. While in one embodiment, the transaction authorization channel used for the second transaction authorization request message is the same transaction authorization channel used for the first transaction authorization request, in other embodiments, transaction processing system 106 uses a different transaction authorization channel (e.g., by selecting a different acquirer electronic device). As discussed above, issuers are already configured to respond to authorization request messages by modifying the account of the account holder to include a transaction entry that includes the data from the billing descriptor field. Thus, as part of the second authorization process of which the second authorization message is a part, issuer electronic device 112A, without requiring any modification to its existing system, responds in the same manner as it normally would respond authorization request messages, which includes modifying the account to include a transaction entry for the second transaction, but in this case the transaction entry includes the data from the billing descriptor field that is intended to notify the account holder of the determination of fraud on the first transaction which was authorized by the issuer. In some embodiments, the transaction entry will be included and be recognizable as a fraud notification if an account holder of the account views pending transactions. Examples of such a notification are provided later herein. In some embodiments, the issuer modifies their system to also recognize those authorization messages that include notifications of fraud and react accordingly.

In one embodiment, the fraud notification transaction appears as a pre-authorization transaction that will persist for a limited time (e.g., several days) as a pending transaction in the account of the account holder, and then removed after the expiration of the limited time. In another embodiment, transaction processing system 106 performs a transaction capture or settlement process with issuer electronic device 112A to finalize the transaction. In such embodiments, a transaction entry for the fraud notification transaction will persist in the account of the account holder (e.g., will appear on the account holder's statement from the issuer of the account). In such embodiments, after the transaction has been finalized, transaction processing system 106 can optionally perform a refund process to credit the account of the account holder with the transaction amount of the fraud notification transaction.

Figure 3A:
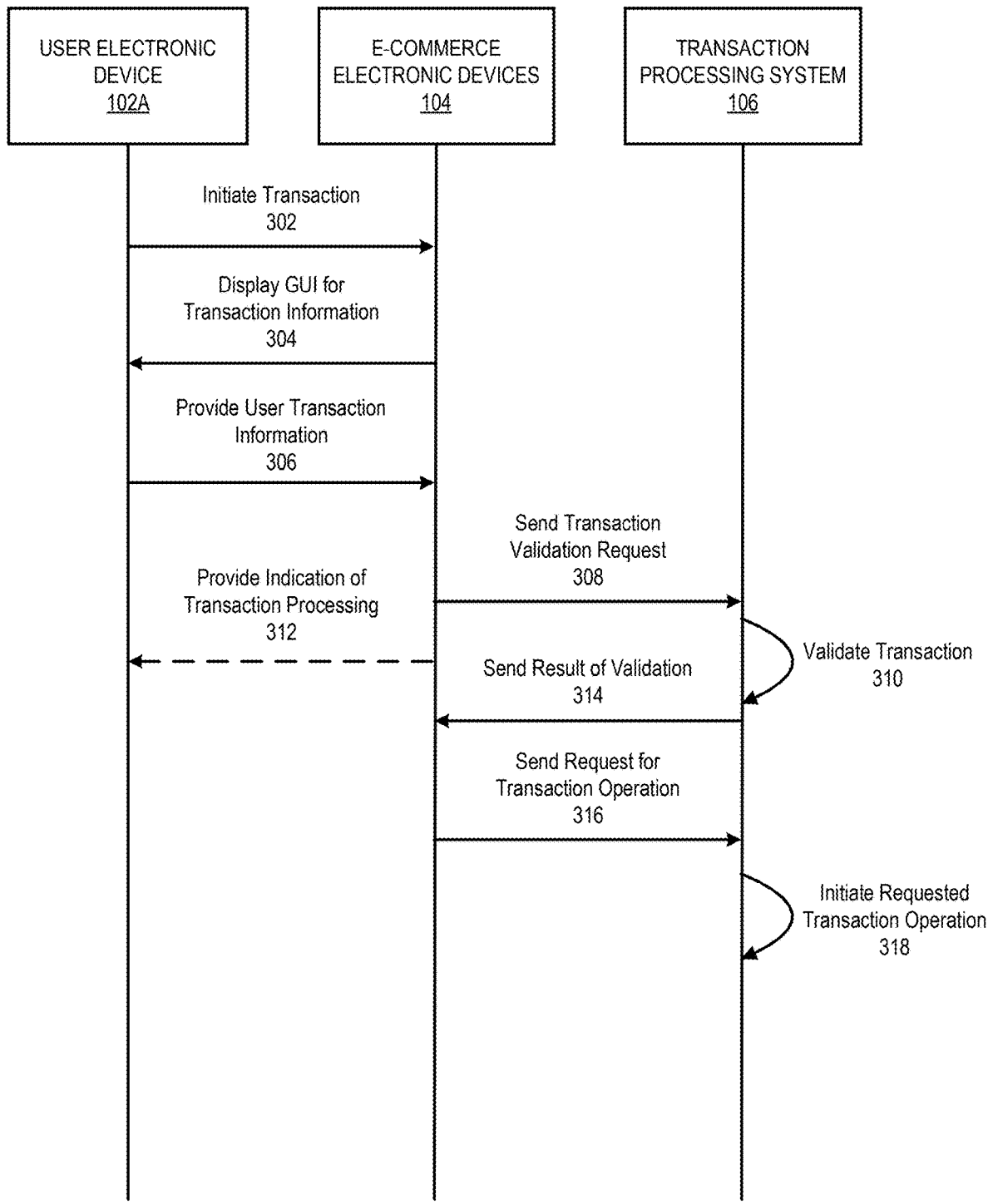
FIGS. 3A-3B are transaction diagrams illustrating the processing of transactions with fraud evaluation according to some example embodiments.
Figure 3B:
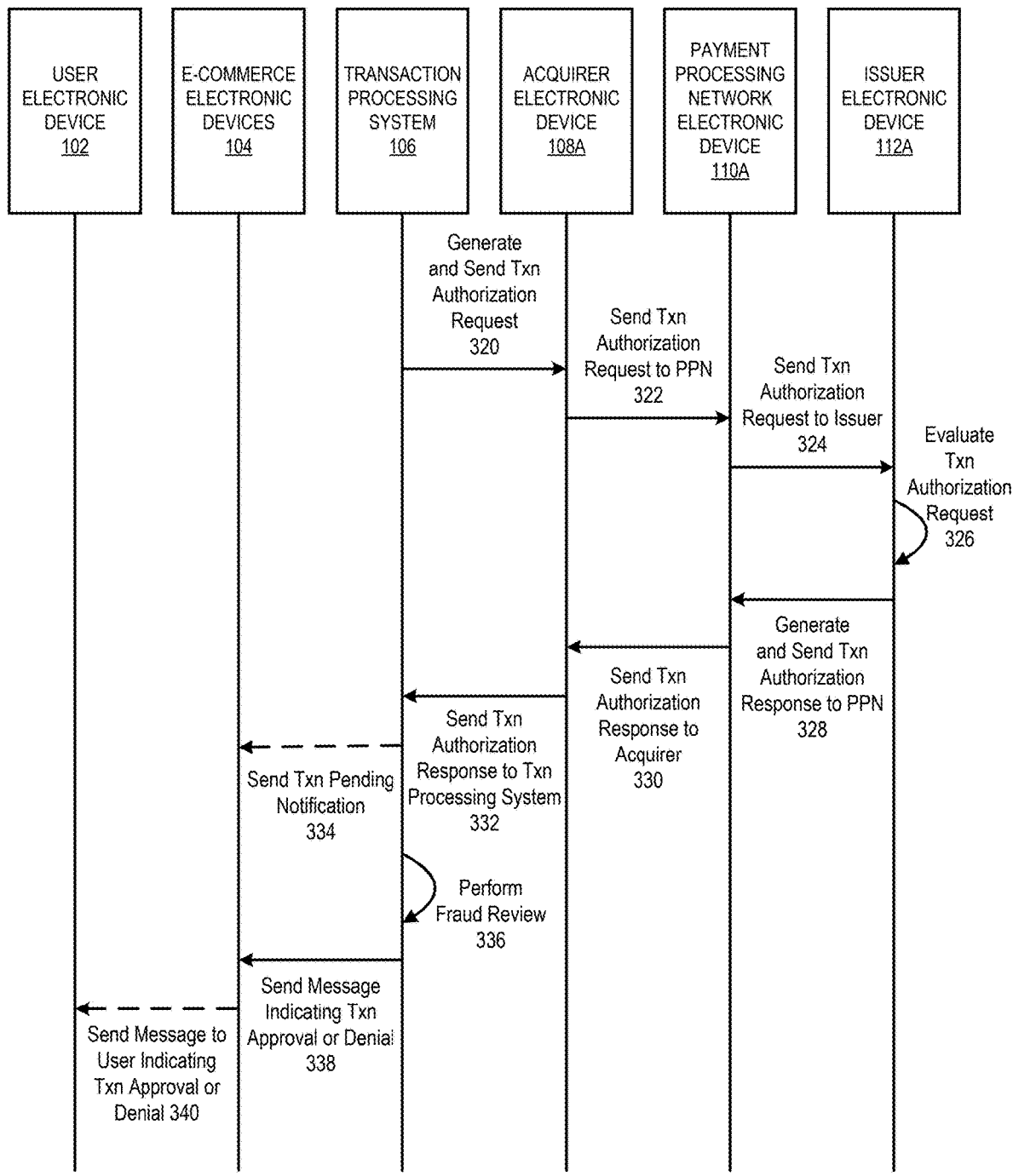

FIGS. 3A-B are transaction diagrams illustrating the processing of transactions with fraud evaluation according to some example embodiments. The operations in this and other transactional diagrams will be described with reference to the exemplary embodiments of the other figures. However, it should be understood that the operations of the transactional diagrams can be performed by embodiments other than those discussed with reference to the other figures, and the embodiments discussed with reference to these other figures can perform operations different than those discussed with reference to the transactional diagrams.

At operation 302, user electronic device 102A initiates a transaction with an e-commerce electronic device (e.g., e-commerce electronic devices 104). While in one embodiment a user electronic device 102A initiates a transaction with e-commerce electronic devices 104 by accessing a merchant's website (such as a landing page of a merchant's website using a browser) other embodiments additionally or alternatively support the user electronic device 102A initiating the transaction with e-commerce electronic devices 104 when user 101A adds a product to a shopping cart, accesses a shopping cart page (e.g., 400 in FIG. 4A), and/or selects a "checkout" button (e.g., button 402 in FIG. 4A). In one embodiment, user 101A accesses and interacts with a merchant's website hosted by e-commerce electronic devices 104 via an application (e.g., a browser, mobile application, etc.) on user electronic device 102A.

In one embodiment, transaction processing system 106 generates a token for the transaction in response to the user electronic device 102A initiating the transaction. While in one embodiment the token generator and validator 120 generates the token using a secret key and data obtained from user information and/or merchant information (including accessing merchant profiles database 130 to determine merchant information or merchant-specified configuration information for generating the requested token), in other embodiments token generator and validator 120 generates the transaction token using any other suitable means, as would be understood by one of ordinary skill in the art (e.g., cryptographic hash, random number generator, etc.).

At operation 304, e-commerce electronic devices 104 cause the display of a graphical user interface (GUI) on user electronic device 102A to obtain user transaction information from user 101A. As described previously, e-commerce electronic devices 104A-104N can include both merchant electronic devices and checkout electronic devices separately, or be a single device that performs the functionalities of merchant electronic devices and checkout electronic devices. Thus, in one embodiment, either a merchant electronic device or a checkout electronic device renders the GUI on user electronic device 102A. While in one embodiment the user transaction information can include user information (e.g., shipping/billing address, payment account information, etc.) and a shipping method, in other embodiments the transaction information sent to e-commerce electronic devices 104 includes more, less, and/or different information. Example GUI screens are depicted in FIGS. 4B-4E. While in FIGS. 4B-4E, e-commerce electronic devices 104 cause the display of the GUI screens on user electronic device 102A as an overlay over a checkout page for the merchant's website (e.g., overlay 404 in FIG. 4B), alternative embodiments could cause the display differently (e.g., user is presented with a full website or a view embedded in a mobile application, user is redirected to another website/webpage or a mobile application, etc.).

At operation 306, user electronic device 102A transmits user transaction information associated with user 101A to e-commerce electronic devices 104. While in one embodiment user electronic device 102A receives the user transaction information from user 101A, other embodiments additionally or alternatively have user electronic device 102A determine the transaction information for the transaction based, at least in part, on accessing stored user information. While in one embodiment, e-commerce electronic devices 104 receive the user transaction information in its raw form, in other embodiments, user electronic device 102A obfuscates the user transaction information prior to sending the user transaction information to e-commerce electronic devices 104. For example, user electronic device 102A tokenizes a payment account number prior to sending to e-commerce electronic devices 104.

At operation 308, e-commerce electronic devices 104 send a transaction validation request to transaction processing system 106. In one embodiment, e-commerce electronic devices 104 generate the transaction validation request using the user transaction information received from user electronic device 102A. E-commerce electronic devices 104 supplement the user transaction information with additional merchant transaction information associated with the transaction. While in one embodiment the merchant transaction information can include product information (e.g., product identifier, purchase price, etc.), merchant account information, and a merchant identifier, in other embodiments the merchant transaction information sent to transaction processing system 106 includes more, less, and/or different information.

In embodiments where transaction processing system 306 generated a token, e-commerce electronic devices 104 append the previously received token to the transaction validation request. In other embodiments, the token is communicated in a different way (e.g., e-commerce electronic devices 104 may include the previously received token within a field in the transaction validation request or may send the previously received token in a separate message that is associated with the transaction validation request via an identifier).

In an alternative embodiment, operations 304 and 306 are bypassed and e-commerce electronic devices 104 access stored user information to generate the transaction information for the transaction (e.g., shipping information, billing information, account information, etc.). In this embodiment, e-commerce electronic devices 104 can send the transaction information to transaction processing system 306 in operation 308 without user input, and the GUI screens depicted in FIGS. 4B-4D are not displayed. In another embodiment, e-commerce electronic devices 104 display the generated transaction information to the user and sends the transaction information to transaction processing system 106 in operation 308 after receiving user confirmation that the transaction information is accurate.

In another alternative embodiment, where the transaction is a scheduled transaction or transaction that is for a regular subscription, input from user electronic device 102A is not required. In such an embodiment, e-commerce electronic devices 104 can initiate the transaction and send stored user information as the transaction information in operation 308, and no GUI screens are displayed to the user via user electronic device 102A.

In another alternative embodiment, e-commerce electronic devices 104 sends the validation request with the request for the transaction operation (operation 316) instead of in a separate validation request. In such an embodiment, operations 310-314 occur after operation 316.

At operation 310, transaction processing system 106 validates the transaction. In one embodiment, transaction validator 118 validates the transaction by checking transaction information against a blacklist. For example, transaction validator 118 determines whether an email address, IP address, phone number, billing/shipping address, and/or a country associated with the transaction are on the blacklist. When a transaction matches one or more items on the blacklist, transaction validator 118 automatically declines the transaction. In one embodiment, token generator and validator 120 validates the transaction by determining whether the transaction validation request includes a valid token.

At operation 312, e-commerce electronic devices 104 optionally provide an indication of transaction processing to user electronic device 102A. For example, overlay screen 409 in FIG. 4E displays an indication to the user 101A, e.g., "Success! Your order has been placed." While in one embodiment e-commerce electronic devices 104 provide this indication after the order has been created, but prior to the payment being completed and/or the transaction processing system 106 performing the fraud review of the transaction, in alternative embodiments e-commerce electronic devices 104 can provide this indication at a later point in time (e.g., while the fraud review is being performed, e.g., operation 336, or after the transaction has been successfully approved by transaction processing system 106, e.g., after operation 338).

At operation 314, transaction processing system 106 sends the result of the validation process to e-commerce electronic devices 104. The result of the validation process indicates whether transaction processing system 106 has determined the transaction to be a valid or invalid transaction. Upon receipt, in some embodiments, the merchant decides how to proceed. While in one embodiment e-commerce electronic devices 104 determine how to proceed based on the result of the validation process, in other embodiments e-commerce electronic devices 104 determine how to proceed based on additional or alternative factors (e.g., merchant-stored profiles of user 101A and/or user electronic device 102A). For example, in the event that the result of the validation process received in operation 314 indicates the transaction is not valid, e-commerce electronic devices 104 can immediately stop the transaction and send a notification to user electronic device 102A that the transaction has failed. However, e-commerce electronic devices 104 can instead choose to continue to an authorization process for the transaction even when the transaction fails the validation process performed by transaction processing system 106.

At operation 316, based, at least in part, on the validation process, e-commerce electronic devices 104 send a request for a transaction operation to transaction processing system 106. In one embodiment, the transaction operation can be one of: authorizing the transaction, voiding the transaction, or refunding the transaction.

At operation 318, transaction processing system 106 initiates the transaction operation. For example, when transaction processing system 106 receives a transaction operation from e-commerce electronic devices 104 to authorize the transaction, transaction processing system 106 initiates a transaction authorization process, as illustrated in the transaction diagram of FIG. 3B.

At operation 320, in response to receiving an instruction from e-commerce electronic devices 104 to perform an authorization for the transaction, transaction processing system 106 generates and sends a transaction authorization request message to an acquirer electronic device (e.g., acquirer electronic device 108A). In one embodiment the transaction authorization request message includes the user transaction information (discussed above) received from user 101A and the merchant transaction information (discussed above) received from e-commerce electronic devices 104. In one embodiment, transaction processing system 106 sends the transaction authorization request message to acquirer electronic device 108A associated with an acquirer having an association with the merchant (e.g., merchant has an account issued by the acquirer).

At operation 322, acquirer electronic device 108A sends the transaction authorization request message to a payment processing network electronic device (e.g., payment processing network electronic device 110A). In one embodiment, acquirer electronic device 108A determines a particular payment processing network associated with an account or payment device used in the transaction. For example, acquirer electronic device 108A identifies the particular payment processing network associated with an account or payment device based on transaction information indicating the particular payment processing network and/or based on the account number for the account or payment device. In such embodiments, acquirer electronic device 108A sends the transaction authorization request message to payment processing network electronic device 110A associated with the particular payment processing network.

At operation 324, payment processing network electronic device 110A sends the transaction authorization request message to an issuer electronic device (e.g., issuer electronic device 112A) of the appropriate issuer. In one embodiment, payment processing network electronic device 110A determines the appropriate issuer based on the user transaction information (e.g., the payment account information for user 101A). For example, based on the user transaction information, payment processing network electronic device 110A determines an issuer of a payment account provided for payment of the transaction, and sends the transaction authorization request message to an issuer electronic device 112A associated with the issuer of the payment account.

At operation 326, issuer electronic device 112A evaluates the transaction authorization request message. Issuer electronic device 112A receives the transaction authorization request message requesting authorization for the transaction and determines whether the payment account associated with user 101A can satisfy the transaction. In one embodiment, issuer electronic device 112A can evaluate the contents of the transaction authorization request message to determine whether the transaction satisfies any conditions and/or settings established by user 101A and/or the issuer. For example, issuer electronic device 112A determines whether the transaction exceeds any user-defined and/or issuer-defined spending limits associated with the payment account. In one embodiment, issuer electronic device 112A evaluates the transaction authorization request message by performing an issuer-based fraud analysis of the transaction. For example, issuer electronic device 112A determines whether the transaction involves a merchant and/or product type prohibited by the user or issuer, and/or violates one or more issuer fraud rules.

At operation 328, based on evaluating the transaction authorization request message, issuer electronic device 112A generates and sends a transaction authorization response message to payment processing network electronic device 110A. In one embodiment, the transaction authorization response message can indicate whether issuer electronic device 112A approved or denied the transaction. While this is illustrated as the transaction authorization response message being sent to the same payment processing network electronic device 110A, that need not be the case in all embodiments (i.e., the message is sent such that it is received by a payment processing network electronic device that is capable of performing the appropriate action and that is associated with the payment processing network of the account or payment device used in the transaction).

At operation 330, payment processing network electronic device 110A sends the transaction authorization response message to an acquirer electronic device. In one embodiment, payment processing network electronic device 110A determines the appropriate acquirer based on an identifier in the transaction authorization response message. While this is illustrated as the transaction authorization response message being sent to the same acquirer electronic device 108A that sent the transaction authorization request (at operation 322), that need not be the case in all embodiments. For example, the response message can be sent such that it is received by one of a plurality of acquirer electronic device associated with a single acquirer (e.g., via a load balancer) that is capable of performing the appropriate action).

At operation 332, acquirer electronic device 108A sends the transaction authorization response message to transaction processing system 106.

At operation 334, transaction processing system 106 sends a transaction pending notification. The transaction pending notification informs e-commerce electronic devices 104 that the transaction is pending and subject to a fraud review by transaction processing system 106. While this is illustrated as the transaction pending notification being sent to the same e-commerce electronic devices 104, that need not be the case in all embodiments (i.e., the message is sent such that it is received by an e-commerce electronic device that is capable of performing the appropriate action and that is associated with the merchant involved in the transaction). In an alternative embodiment, operation 334 is optionally bypassed and transaction processing system 106 does not send the transaction pending notification to e-commerce electronic devices 104, but instead proceeds to operation 336 to perform the fraud review.

At operation 336, transaction processing system 106 performs a fraud review of the transaction. While in one embodiment, transaction processing system 106 initiates the fraud review after sending the transaction pending notification to e-commerce electronic devices 104, in other embodiments, transaction processing system 106 initiates the fraud review before, concurrently with, or without sending the transaction pending notification to e-commerce electronic devices 104. While in one embodiment, fraud evaluator 122 analyzes transaction information for the transaction and transaction information for previous transactions performed by user 101A, in alternative embodiments, fraud evaluator 122 also analyzes transaction information for previous transactions performed by users other than user 101A, where the transaction information includes user behavior information. For example, fraud evaluator 122 can access previous transaction performed by all users or a subset of users with similar characteristics and/or purchasing habits/history as user 101A. In some embodiments, fraud evaluator 122 retrieves fraud models from fraud models database 132 and applies the transaction information for the current transaction (and optionally one or more previous transactions) to one or more of the fraud models. In some embodiments, the fraud evaluator 122 also uses user behavior database 134 when performing the fraud review.

Figure 5:
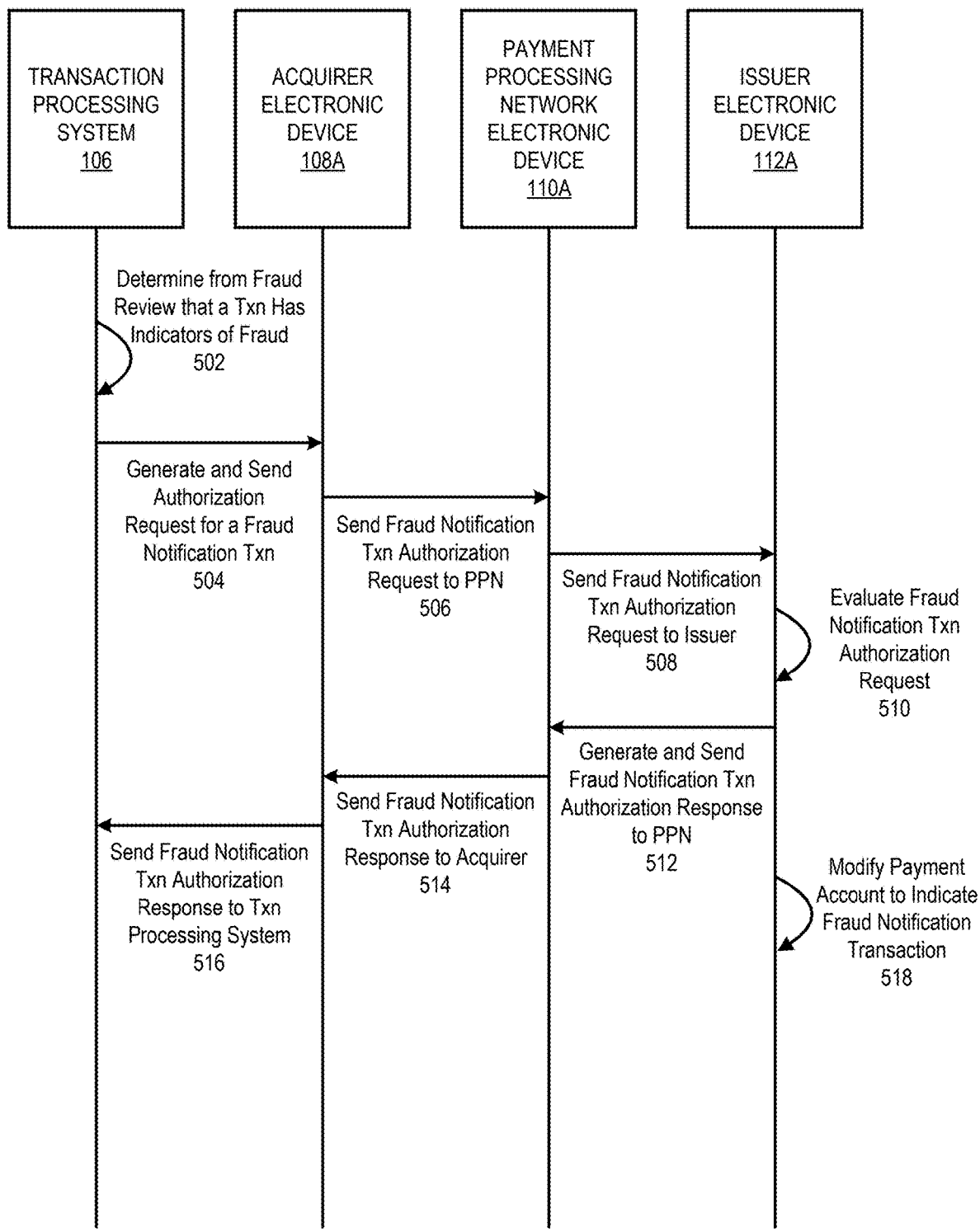
FIG. 5 is a transaction diagram illustrating the processing of a fraud notification transaction according to some example embodiments.

In one embodiment, when transaction processing system 106 determines that there are indicators of fraud, transaction processing system 106 initiates a fraud notification transaction (as described in FIG. 5).

At operation 338, transaction processing system 106 sends a fraud review message indicating transaction approval or rejection. Transaction processing system 106 generates the fraud review message in response to the result of the fraud review. Based on the result of the fraud review message, e-commerce electronic devices 104 (e.g., either the merchant electronic device, the checkout electronic device, or a combined device) performs an action with respect to the transaction. For example, e-commerce electronic devices 104 can proceed to fulfillment of the transaction when the transaction authorization request is approved based on the fraud review, or e-commerce electronic devices 104 can provide an indication to user electronic device 102A that the transaction was declined when the transaction is rejected based on the fraud review. While this is illustrated as the messaging indicating approval or denial of the transaction being sent to the same e-commerce electronic devices 104, that need not be the case in all embodiments (i.e., the message is sent such that it is received by an e-commerce electronic device that is capable of performing the appropriate action and that is associated with the merchant involved in the transaction).

At operation 340, e-commerce electronic devices 104 can optionally send one or more messages to user electronic device 102 based on the results of the fraud review. For example, if the fraud review indicated transaction approval, the transaction can proceed with e-commerce electronic devices 104 optionally sending user electronic device 102 the results of the fraud review. If the fraud review indicated further authentication processing is required, e-commerce electronic devices 104 can send an additional message to user electronic device 102, such as a challenge (e.g. CAPTCHA), and send a notification indicating whether the challenge process resulted in the transaction being approved or rejected. If the fraud review indicated transaction rejection, either the merchant (via a merchant electronic device) or transaction processing system 106 (via a checkout electronic device) can optionally send a notification to user electronic device 102.

Figure 4A:
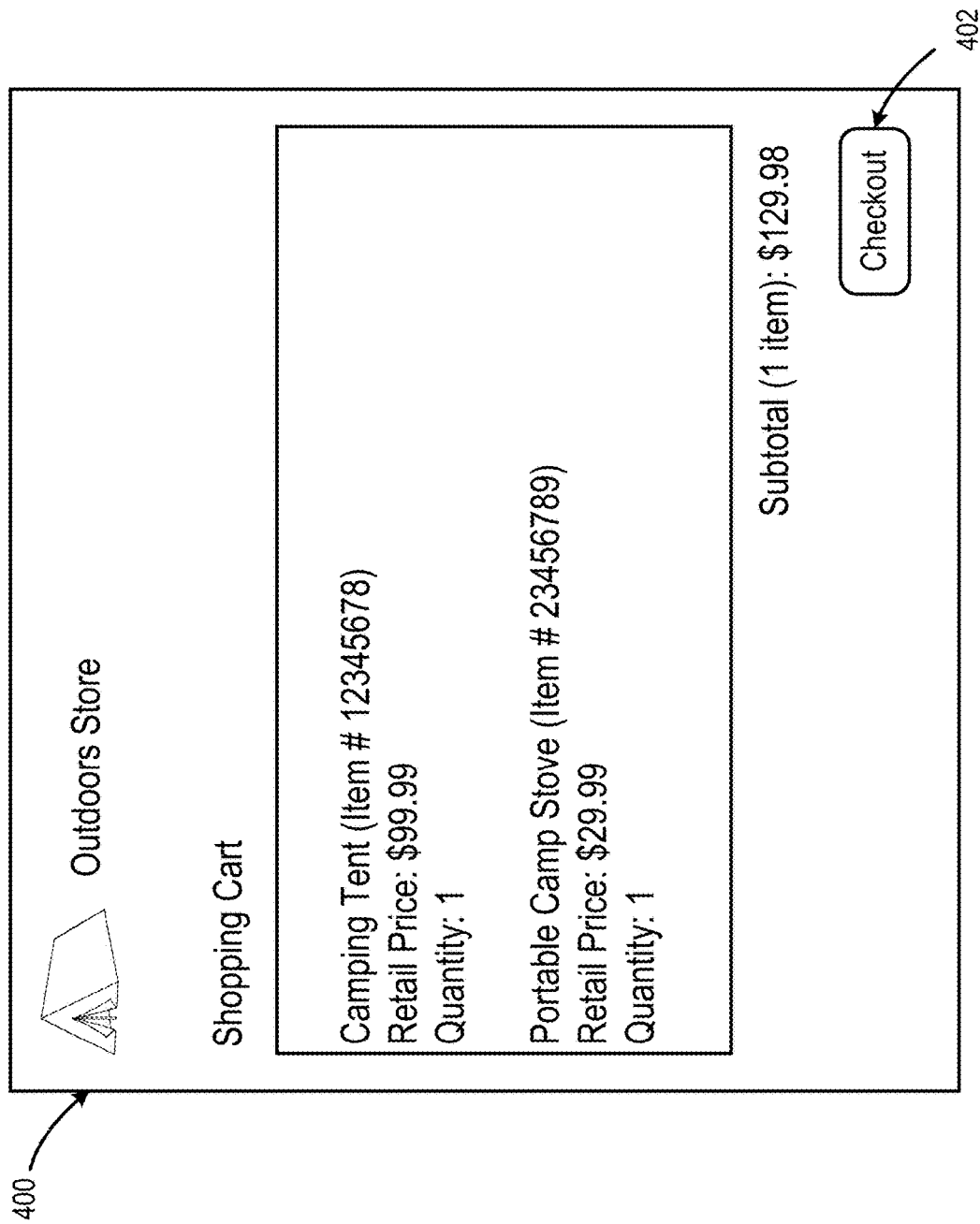
FIGS. 4A-4E depict graphical user interfaces for use in the processing of transactions using a transaction processing system according to some example embodiments.
Figure 4B:
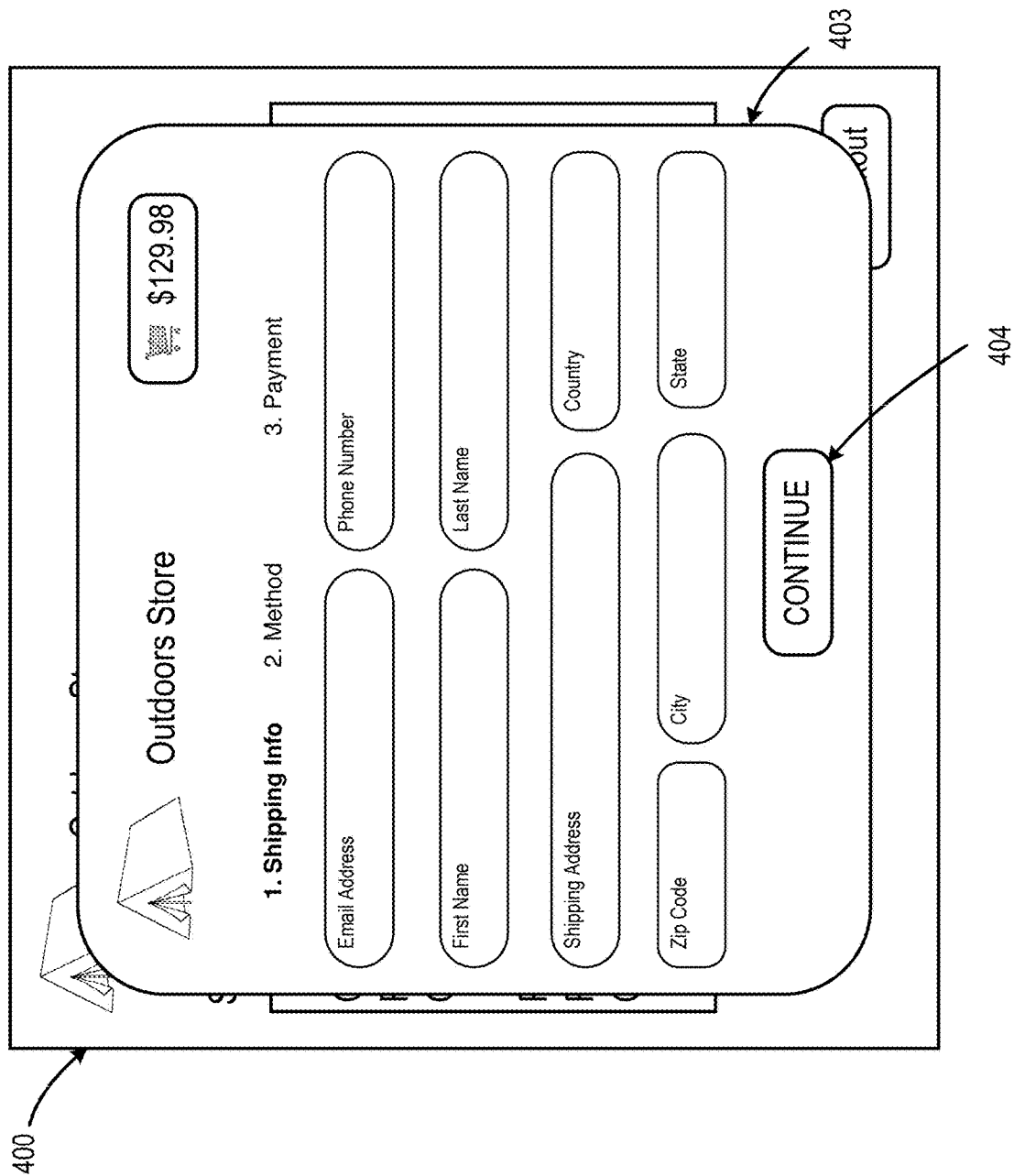
Figure 4C:
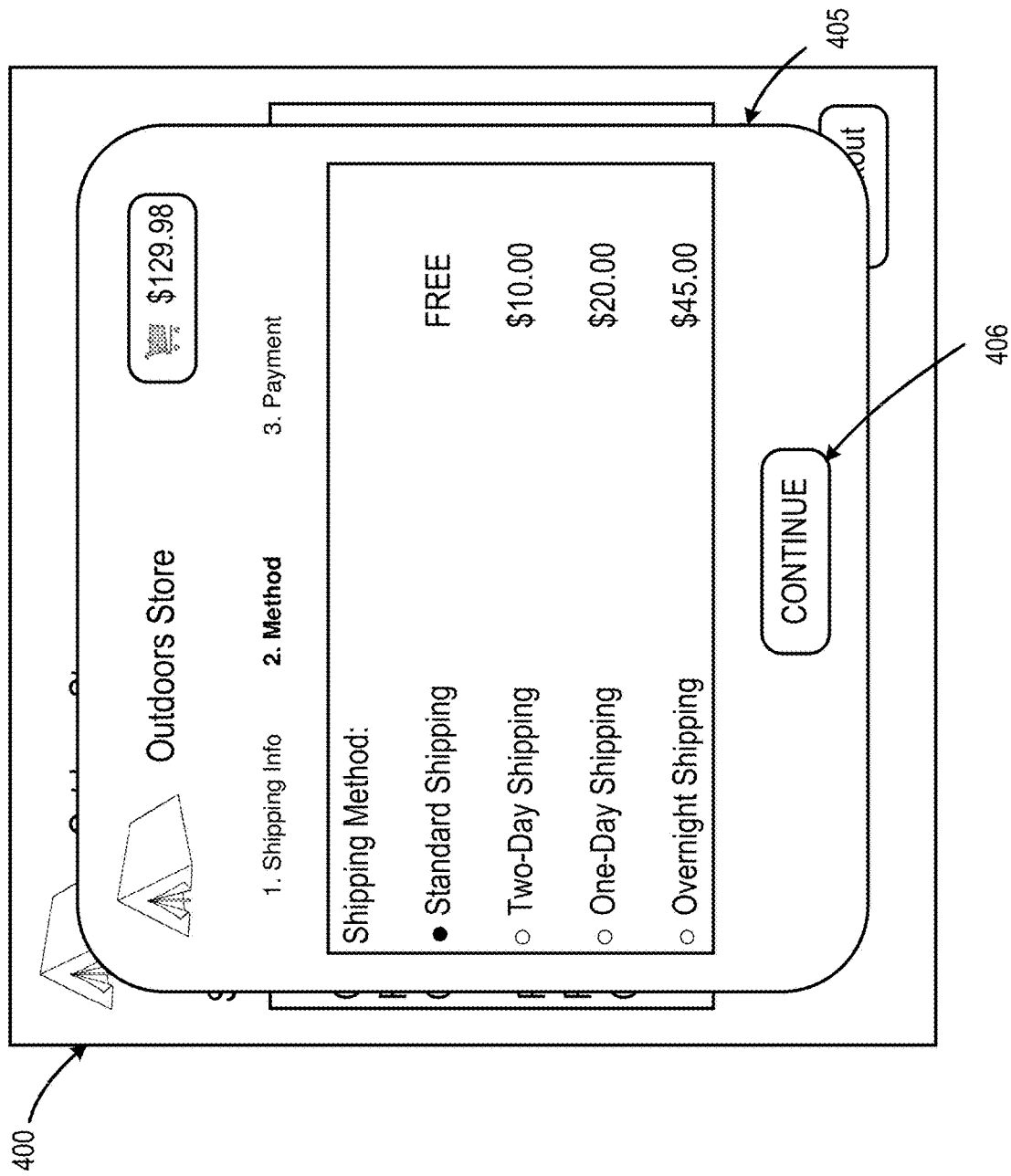
Figure 4D:
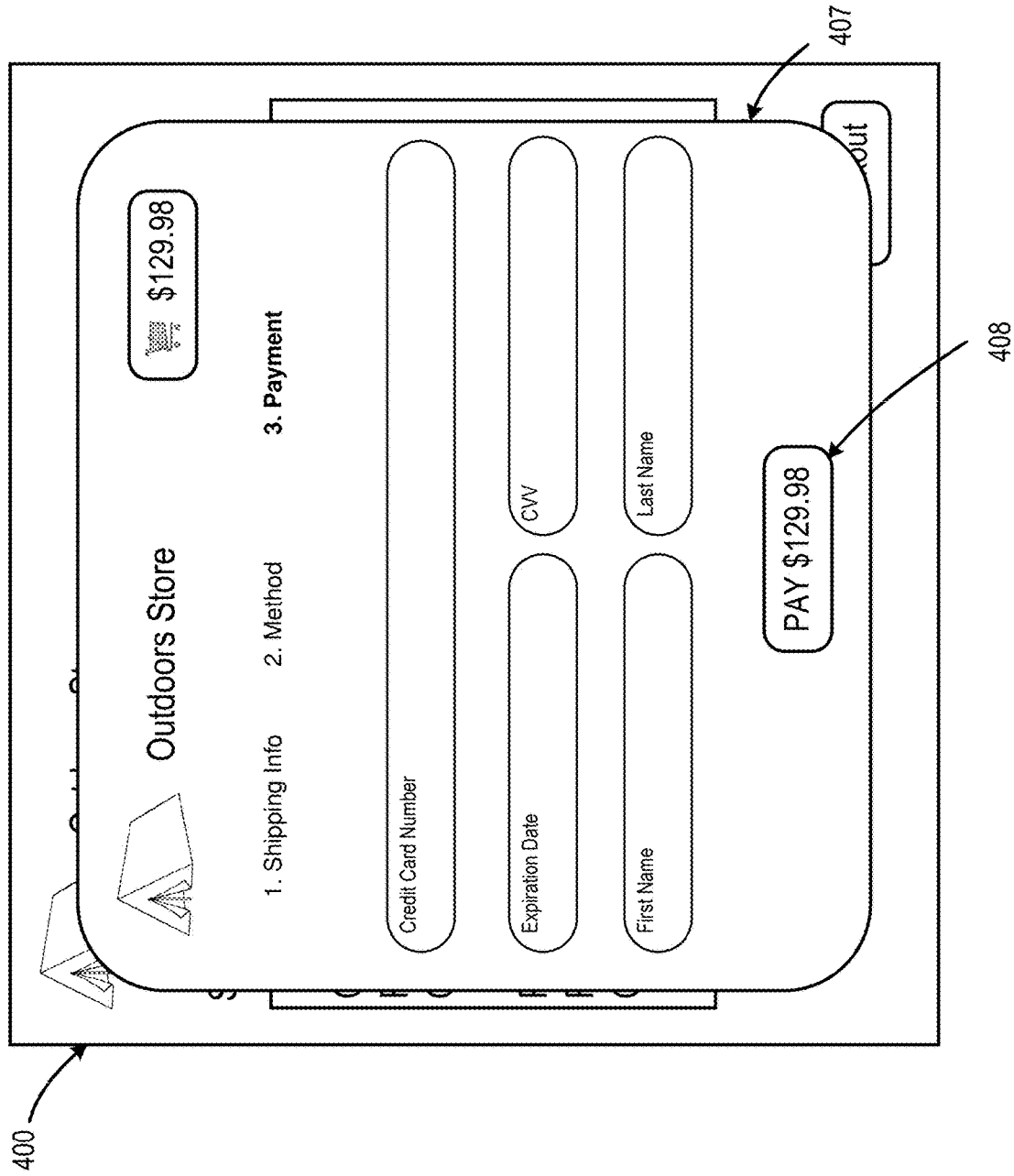

FIGS. 4A-4E depict graphical user interfaces for use in the processing of transactions using a transaction processing system (e.g., transaction processing system 106) according to some example embodiments. FIG. 4A depicts shopping cart page 400 for merchant "Outdoors Store." As illustrated in FIG. 4A, shopping cart page 400 for a user (e.g., user 101A) includes a camping tent and a portable camp stove.

In response to receiving a selection of checkout button 402, transaction processing system 106 causes the display of transaction processing system overlay 403 over shopping cart page 400, as depicted in FIG. 4B. In another embodiment, in response to receiving the selection of checkout button 402 on a merchant website, an application (e.g., browser) on a user electronic device is redirected to a new webpage. In such an embodiment, an e-commerce electronic device hosting the merchant website generates and sends the new webpage displaying the user interfaces depicted as overlays 403, 405, 407, and 409 to the appropriate user electronic device, and the e-commerce electronic device receives transaction data from the user electronic device on behalf of and sends the received data to transaction processing system 106.

Figure 4E:
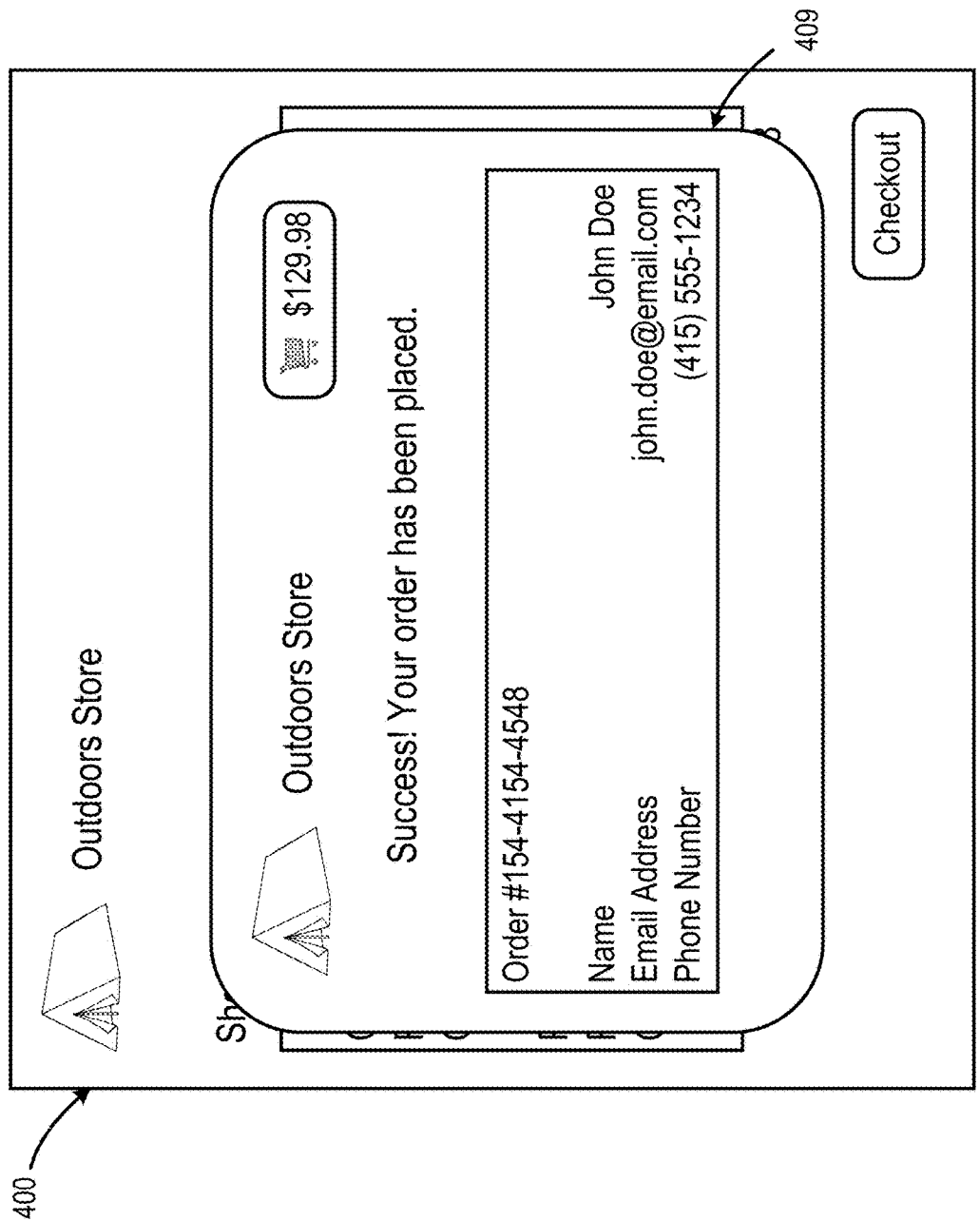

In FIG. 4B, transaction processing system overlay 403 displays fields to allow a user to enter shipping address information and continue button 404 to continue the checkout process. In FIG. 4C, transaction processing system overlay 405 allows a user to select a shipping method and continue button 406 to continue the checkout process. In FIG. 4D, transaction processing system overlay 407 displays fields to allow a user to enter payment information and payment button 408 to complete the checkout process. FIG. 4E displays transaction processing system overlay 409 that includes order confirmation information. While FIGS. 4A-4E illustrate some example embodiments that use a series of overlays that display certain information and requests certain information in certain locations of the overlay, alternative embodiments may operate differently (e.g., use more, less, and/or different overlays; rather than using overlays, the merchants website redirects to a website provided by the transaction processing system; display more, less, and/or different information; request more, less, and or different information; display and or request the information in more, not less, and or different locations). As noted above, in some embodiments, a user electronic device accesses stored user information to use as the transaction information for the transaction, without requiring user input. In such embodiments, selecting checkout button 402 in FIG. 4A provides a confirmation to use the stored user information as the transaction information, and FIGS. 4B-4D are not displayed. Similarly, as noted above, a merchant can access merchant-stored user information after a user selects checkout button 402 in FIG. 4A, where selecting checkout button 402 grants permission to the merchant to use the merchant stored user information. In another embodiment, as noted above, where the merchant charges a user for goods or services based on an agreed schedule (e.g., a subscription), the merchant can initiate the transaction by utilizing merchant-stored user information. In such embodiments, the merchant initiates the transaction without user input and FIGS. 4A-4E are not displayed.

FIG. 5 is a transaction diagram illustrating the processing of a fraud notification transaction according to some example embodiments. When transaction processing system 106 identifies indicators of fraud in a transaction after performing a fraud review (e.g., as described in operation 342 of FIG. 3), transaction processing system 106 initiates a second transaction (referred to herein as a fraud notification transaction). As illustrated in the transaction diagram of FIG. 5, transaction processing system 106 uses a transaction authorization channel used to authorize traditional payment transactions to handle the fraud notification transaction.

At operation 502, transaction processing system 106 determines, from a fraud review of an authorized transaction, that the authorized transaction has indicators of fraud. While in one embodiment, fraud evaluator 122 of transaction processing system 106 uses only transaction information for the authorized transaction as part of the fraud review, in other embodiments, fraud evaluator 122 utilizes a history of previous transactions of the user or multiple users and a history of user behavior of the user or multiple users, in addition to the transaction information for the authorized transaction, for the fraud review. For example, indicators of fraud can include: indications of an abnormal transaction (e.g., a transaction amount significantly higher than average transaction for the user or for an average user), mismatched billing address and shipping address, unexpected IP address, multiple transactions from a single IP address using one or more accounts, and/or multiple transactions in a short period of time. Further, in response to determining that the authorized transaction has indicators of fraud, transaction processing system 106 declines the authorized transaction. In one embodiment, transaction processing system 106 also sends a notification to the merchant associated with the authorized transaction that the transaction has been denied as a result of the fraud review.

At operation 504, transaction processing system 106 generates and sends a second transaction authorization request message as part of a second transaction (referred to herein sometimes as a fraud notification transaction) to the acquirer (e.g., acquirer electronic device 108A) via the transaction authorization channel. While this is illustrated as the second transaction authorization request message being sent to the same acquirer electronic device 108A as the first transaction authorization request message (depicted in FIG. 3B), that need not be the case in all embodiments (i.e., the message is sent such that it is received by an acquirer electronic device that is capable of performing the appropriate action and that is associated with the acquirer).

While in one embodiment, transaction processing system 106 initiates the second transaction for a non-zero transaction amount, in other embodiments, transaction processing system 106 generates the second transaction for a transaction amount of zero. In embodiments where the transaction amount is non-zero, transaction processing system 106 typically generates a small non-zero amount (e.g., less than ten cents). While in one embodiment, transaction processing system 106 generates the second transaction with the small non-zero amount so that the transaction total has a smaller likelihood of being declined (versus a large transaction total) and/or because an issuer may not display a transaction without a transaction total or with $0.00 as the transaction total, other embodiments operate differently (e.g., use the amount as in the original transaction, use a $0.00 amount, use a negative amount, etc.). Transaction processing system 106 retrieves the payment account information associated with the fraudulent transaction for insertion as the payment account for the second transaction.

In one embodiment, transaction processing system 106 generates a billing descriptor for the fraud notification transaction to indicate that the transaction was fraudulent. The various alternatively previously described with regard to the generation of a billing descriptor apply here. For example, transaction processing system 106 can generate a billing descriptor stating, "FRAUD ALERT (CONTACT ISSUER OF ACCOUNT)," "INDICATIONS OF FRAUD FOR TRANSACTION WITH MERCHANT A," or any other similar notification. The billing descriptor can include additional information regarding the transaction indicated to be fraudulent, including a merchant name, a transaction amount, a transaction date and/or time, and/or a geolocation from where the transaction was initiated. For example, transaction processing system 106 may generate a billing descriptor stating, "FRAUD ALERT (STORE.COM 2018 Sep. 26 $21.84)." Additionally, or alternatively, transaction processing system 106 generates a billing descriptor that is or includes a predefined identifier (e.g., transaction code) that is recognizable to an issuer (e.g., issuer electronic device 112A). In such embodiments, when issuer electronic device 112A identifies the transaction code that indicates a fraudulent transaction, issuer electronic device 112A may automatically replace the transaction code (or the entire billing descriptor) received with a predefined message, such as a message similar to the billing descriptor examples above, and displays the predefined message as the billing descriptor for the entry. Also, the alternative embodiments previously described regarding the use of another and/or multiple fields in the transaction authorization request message apply here.

At operation 506, acquirer electronic device 108A sends the second transaction authorization request message to a payment processing network (e.g., payment processing network electronic device 110A), in a similar manner as previously described in operation 328.

At operation 508, payment processing network electronic device 110A sends the second transaction authorization request message to the appropriate issuer (e.g., issuer electronic device 112A), in a similar manner as previously described in operation 330.

At operation 510, issuer electronic device 112A evaluates the second transaction authorization request message, in a similar manner as previously described in operation 332. In one embodiment, issuer electronic device 112A can identify the second transaction as a fraud notification transaction, e.g., by identifying one or more keywords in the billing descriptor or by identifying a merchant identifier indicating that the transaction is a fraud notification transaction.

At operation 512, based on evaluating the second transaction authorization request message, issuer electronic device 112A generates and sends a second transaction authorization response message to payment processing network electronic device 110A, in a similar manner as previously described in operation 332, to indicate whether issuer electronic device 112A approved or denied the second transaction.

At operation 514, payment processing network electronic device 110A sends the second transaction authorization response message to acquirer electronic device 108A, in similar manner as previously described in operation 336.

At operation 516, acquirer electronic device 108A sends the fraud notification transaction authorization response message to transaction processing system 106. The fraud notification transaction authorization response message indicates to transaction processing system 106 of the successful delivery of the message indicating fraud in the billing descriptor of the fraud notification transaction to issuer electronic device 112A and the payment account of the user. In one embodiment, transaction processing system 106 can perform a transaction settlement process with issuer electronic device 112A. In such embodiments, a transaction entry for the fraud notification transaction will persist in the account of the account holder (e.g., will appear on the account holder's statement from the issuer of the account). In such embodiments, after the transaction has been finalized, transaction processing system 106 can optionally perform a refund process to credit the account of the account holder with the transaction amount of the fraud notification transaction.

At operation 518, issuer electronic device 112A modifies the payment account to indicate the second transaction. Issuer electronic device 112A modifies the payment account to show the authorization for the second transaction (e.g., as a pending transaction entry in the payment account visible to the user). In such embodiments, while processed as a traditional payment transaction, the entry in the payment account operates as a fraud notification to the account holder of the account by notifying the account holder of the detected fraud, enabling the user to perform an action (e.g., contact issuer to block future transaction, cancel account or payment device, close account, etc.).

Figure 6:
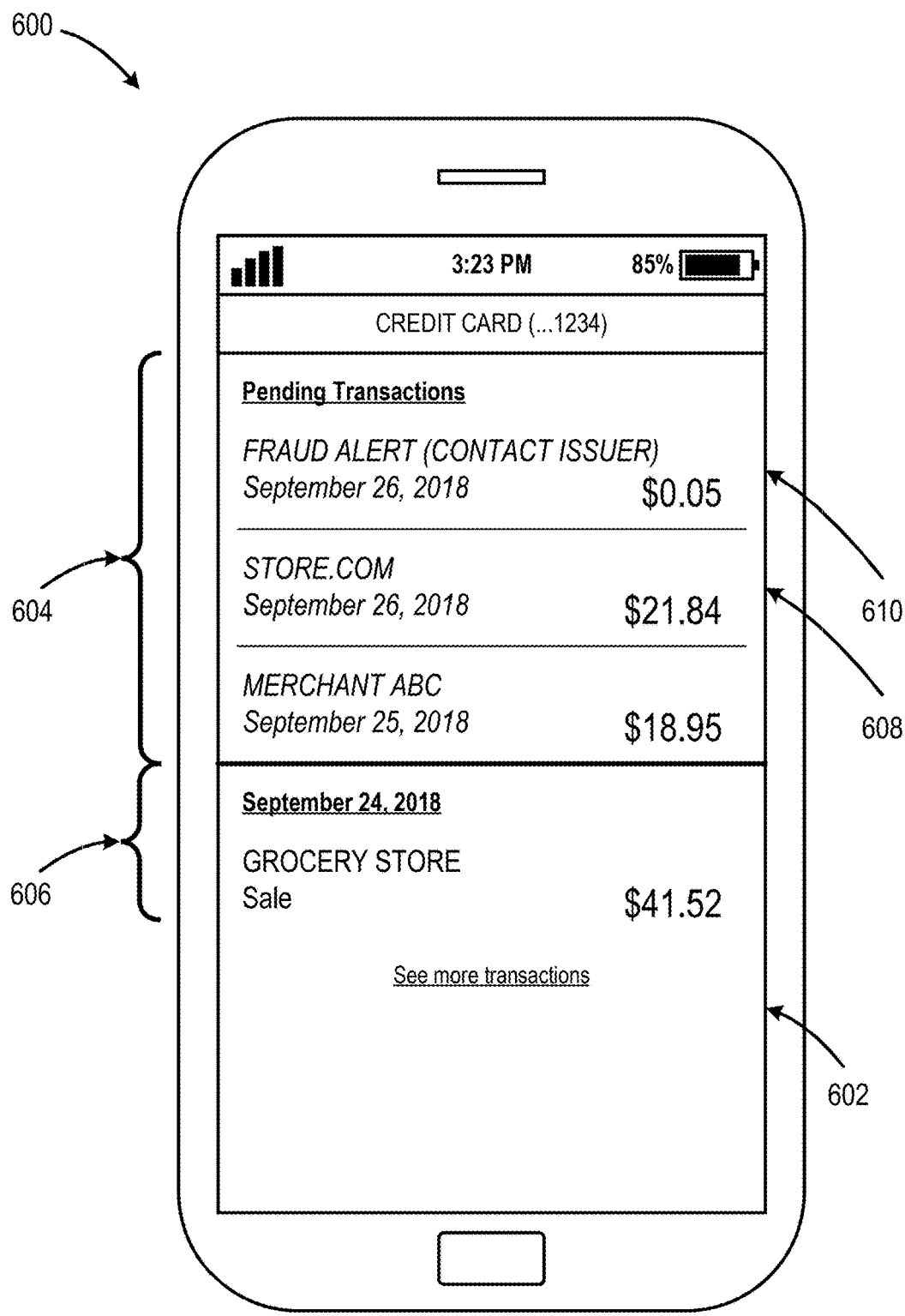
FIG. 6 depicts a graphical user interface for use in displaying an indication of a fraud notification transaction according to some example embodiments.

FIG. 6 depicts a graphical user interface for use in displaying an indication of a fraud notification transaction according to some example embodiments. While FIG. 6 depicts user electronic device 600 (e.g., a smartphone, mobile phone, etc.) with display element 602 displaying a graphical user interface, such information may be displayed on other types of devices and/or interface (e.g., a website of the issuer; as a notification sent via text message or using an app; etc.). The graphical user interface depicts a transaction register associated with a payment account on a mobile application or website of the issuer associated with the payment account. The graphical user interface displays transactions associated with for a payment account, including pending transaction entries 604 and processed transaction entry 606. In one embodiment, transaction entry 608 is a first transaction performed between a user and a merchant, which has been authorized by the issuer of an account in response to a first transaction authorization request for the first transaction. The issuer electronic device (e.g., issuer electronic device 112A) associated with the issuer modifies the payment account to display pending transaction entry 608 in response to authorizing the first transaction. For example, transaction entry 608 is for an authorized e-commerce transaction with the website store.com on Sep. 26, 2018, with a transaction total of $21.84. Subsequently, transaction processing system 106 determines that the first transaction has indications of fraud and generates a second transaction authorization request for a second transaction (e.g., a fraud notification transaction). Issuer electronic device 112A modifies the payment account to display pending transaction entry 610 in response to authorizing the second transaction received in the second transaction authorization request message (e.g., the transaction authorization request message used to carry the fraud notification). Pending transaction entry 610 includes information sent in the fraud notification transaction authorization request message, including the billing descriptor that indicates the detection of fraud by transaction processing system 106, the date of the fraud notification transaction authorization request message, and the amount of the fraud notification transaction. As depicted in pending transaction entry 610, the billing descriptor states, "FRAUD ALERT (CONTACT ISSUER)," to indicate to the account holder that indications of fraud have been detected on the payment account. As previously described, alternative embodiments of pending transaction entry 610 may include more, less, and/or different information. For example, in another embodiment, pending transaction entry 610 includes transaction information referencing the fraudulent transaction (e.g., the transaction associated with transaction entry 608), by including one or more of a merchant name, a merchant location, and a time and/or date of the fraudulent transaction.

In other embodiments, issuer electronic device 112A automatically performs an action in response to determining that the transaction has indicators of fraud (e.g., blocking or otherwise preventing further transactions using the payment account). For example, issuer electronic device 112A can parse the transaction information in the fraud notification transaction, including the billing descriptor generated by transaction processing system 106, and identify keywords indicating that fraud was determined. For example, issuer electronic device 112A can flag transactions with billing descriptors that include the words "fraud," "suspicious," or similar words.

While in one embodiment, the fraud notification transaction is a pre-authorization that will be removed after a period of time, in another embodiment, the transaction processing system 106 subsequently performs a transaction settlement process with the issuer electronic device 112A to settle the transaction (e.g., finalize the movement of funds from the issuer to the acquirer). In such embodiments, pending transaction entry 610 for the fraud notification transaction will persist in the account of the user (e.g., will appear on the user's statement from the issuer of the account).

Exemplary Electronic Devices
Electronic Device and Machine-Readable Media

One or more parts of the above embodiments may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals-such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or client) to communicate with the service. Also, some electronic devices may execute code to cause them to operate as one or more servers and execute code to cause them to operate as one or more clients of other servers. The server and client electronic devices may be operated by users respectively in the roles of administrator (also known as an administrative user) and end user (or just user). With reference to FIG. 1, the e-commerce electronic devices 104A-104N may be server electronic devices executing code to provide a service to user electronic devices 102A-102Z, which are client electronic devices executing a client (such as a web browser, a native client, a portal, a command-line interface, and/or an application program interface (API) based upon protocols such as Simple Object Access Protocol (SOAP), Representational State Transfer (REST), etc.) to communicate with the servers. In addition, the e-commerce electronic devices 104A-104N may also execute code such that they operate as clients of transaction processing system 106 and possibly acquirer electronic devices 108A-N. Similarly, the transaction processing system 106 and possibly acquirer electronic devices 108A-N, payment processing network electronic devices 110A-N, and/or issuer electronic devices 112A-N may be server electronic devices that execute code to operate as one or more servers and one or more clients.

Figure 7:
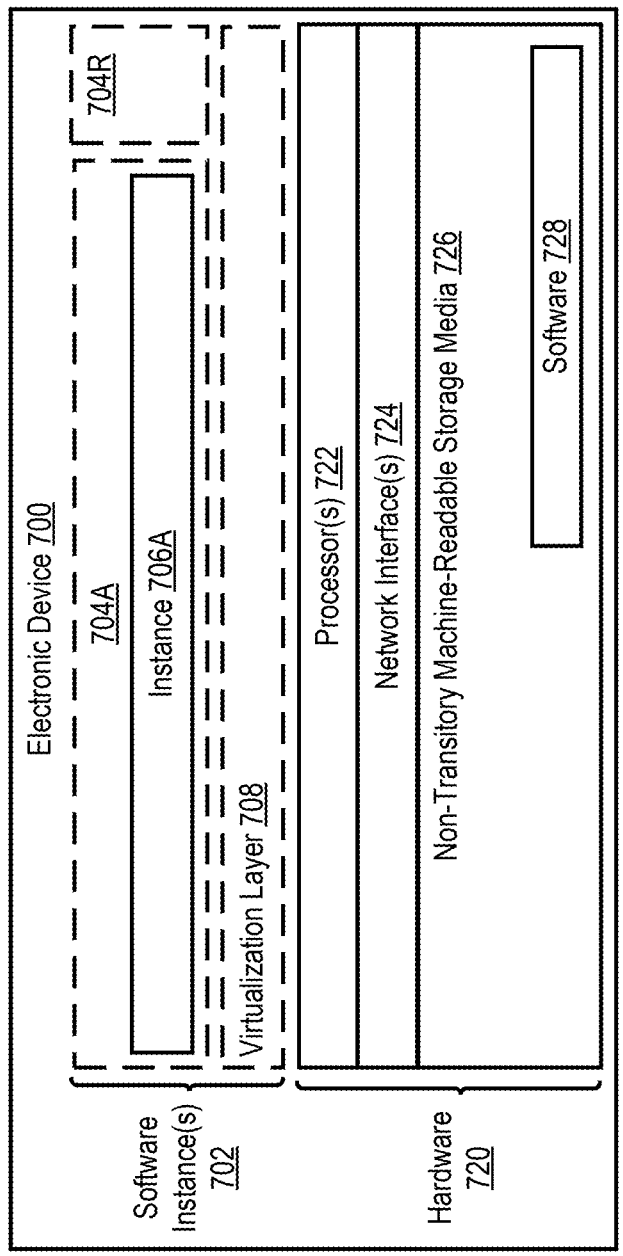
FIG. 7 is a block diagram illustrating an electronic device according to some example embodiments.

FIG. 7 is a block diagram illustrating an electronic device 700 according to some example embodiments. FIG. 7A includes hardware 720 comprising a set of one or more processor(s) 722, a set of one or more network interfaces 724 (wireless and/or wired), and non-transitory machine-readable storage media 726 having stored therein software 728 (which includes instructions executable by the set of one or more processor(s) 722). Each of the previously described electronic devices may be implemented using one or more electronic devices 700. In some embodiments: 1) each of the user electronic devices is implemented in a separate one of the electronic devices 700 (e.g., the software 728 represents the software to implement end user clients to interface with the service provided by the e-commerce electronic devices); 2) the e-commerce electronic devices are implemented in other electronic devices 700 (e.g., a set of one or more server electronic devices where the software 728 represents the software to implement the merchant websites); and 3) in operation, the user electronic devices and the e-commerce electronic devices would be communicatively coupled (e.g., by a network) and would establish between them (or through one or more other layers) connections for the user electronic devices to submit requests (e.g., HTML request) to the e-commerce electronic devices and the e-commerce electronic devices to send responses Similarly, transaction processing system 106 may include hardware, e.g. hardware 720, and software, e.g., software 728, executing on that hardware to perform the above discussed actions of the transaction processing system; in operation, the transaction processing system electronic devices and the e-commerce electronic devices would be communicatively coupled (e.g., by a network) and would establish between them (or through one or more other layers) connections for performing the transactions discussed above.

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative embodiments of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Miscellaneous

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain embodiments, it should be understood that such order is exemplary (e.g., alternative embodiments may perform the operations in a different order, combine certain operations, overlap certain operations, etc.).

While the above description includes several exemplary embodiments, those skilled in the art will recognize that the invention is not limited to the embodiments described and can be practiced with modification and alteration within the spirit and scope of the appended claims. The description is thus illustrative instead of limiting.

What is claimed is:

1. A method comprising, by a computing system:
receiving, from a first electronic device, first interaction information for a first interaction between a user and an online entity;
generating a first interaction authorization request message in a pre-determined authorization request message format based on the first interaction information;
sending, via a communication channel between the computing system and an issuer electronic device associated with an issuer of an account of the user, the first interaction authorization request message to the issuer electronic device;
receiving, via the communications channel from the issuer electronic device, a first interaction authorization response message in a pre-determined authorization response message format;
determining that the first interaction authorization response message indicates approval of the first interaction;
generating instructions for the issuer electronic device to repurpose a first field by replacing an interaction code with a predefined message that comprises information that is different than online entity information, wherein the interaction code is configured to represent to the issuer electronic device that the predefined message corresponds to the first field;
generating, despite the first interaction authorization message indicating approval of the first interaction, a second interaction authorization request message in the pre-determined authorization request message format, wherein the second interaction authorization request message in the pre-determined authorization request message format comprises the first field that includes the instructions generated by the computing system; and
sending, via the communication channel, the second interaction authorization request message to the issuer electronic device to instruct the issuer electronic device to replace content of the first field with the predefined message.

2. The method of claim 1, wherein the first interaction authorization request message comprises information regarding the online entity in the first field.

3. The method of claim 1, wherein the second interaction authorization request message comprises data representing a notification of potential fraud on the account of the user.

4. The method of claim 3, wherein the second interaction authorization request message comprises one or more of an online entity name, an interaction amount, an interaction date; or
an interaction time associated with the first interaction as the data representing the notification of potential fraud on the account.

5. The method of claim 3, wherein the instructions cause the issuer electronic device to modify the account of the user such that the notification of potential fraud on the account of the user is visible as a pending interaction.

6. The method of claim 3, wherein generating the second interaction authorization request message comprises determining, by a fraud evaluator module of the computing system and based on the first interaction information for the first interaction and one or more second interaction information for one or more previous interactions associated with the user, that the first interaction between the user and the online entity presents one or more indicators of a plurality of predefined indicators of potential fraud.

7. The method of claim 6, wherein the one or more indicators of the plurality of predefined indicators of potential fraud comprise one or more of:
  indications of an abnormal interaction;
  mismatched billing address and shipping address between the first interaction information and information associated with the account of the user;
  an unexpected internet protocol (IP) address associated with the first interaction;
  multiple interactions from a single IP address using one or more accounts associated with one or more users; or
  multiple interactions associated with the account of the user in a specified period of time.

8. The method of claim 6, wherein generating the second interaction authorization request message comprises:
  retrieving, by the fraud evaluator module, the one or more second interaction information for one or more previous interactions associated with the user;
  applying, by the fraud evaluator module, the first interaction information for the first interaction and the one or more second interaction information for the one or more previous interactions associated with the user to one or more pre-trained fraud models;
  retrieving, by the fraud evaluator module from a fraud models database of the computing system, the plurality of predefined indicators of potential fraud; and
  determining, by the fraud evaluator module and based on the application of the first interaction information for the first interaction and the one or more second interaction information for the one or more previous interactions associated with the user to one or more pre-trained fraud models, that the first interaction between the user and the online entity presents the one or more indicators of the plurality of predefined indicators of potential fraud.

9. The method of claim 8, further comprising:
  accessing, by the fraud evaluator module, a user behavior database of the computing system storing a history of user behavior of the user and a plurality of users associated with a plurality of accounts; and
  analyzing, by the fraud evaluator module, the first interaction based on the history of user behavior of the user and the plurality of users associated with the plurality of accounts.

10. The method of claim 8, further comprising:
  in response to the fraud evaluator module determining that the first interaction between the user and the online entity presents the one or more indicators of the plurality of predefined indicators of potential fraud, declining the first interaction; and
  updating one or more fraud models stored in the fraud models database based on the first interaction information for the first interaction.

11. The method of claim 1, further comprising:
  accessing a database storing a history of previous interactions of the user and a plurality of users associated with a plurality of accounts;
  generating the instructions interpretable by the issuer electronic device based at least in part on analyzing the first interaction based on the history of previous interactions of the user and the plurality of users associated with the plurality of accounts.

12. The method of claim 1, further comprising:
  causing an interaction entry corresponding to the second interaction authorization request message to persist in an account history of the account of the user.

13. The method of claim 12, wherein the second interaction is associated with a second interaction amount, the method further comprising:
  after causing the interaction entry corresponding to the second interaction authorization request message to persist in the account history of the account of the user, crediting the account of the user with the interaction amount of the second interaction.

14. The method of claim 1, wherein the second interaction authorization request message is a pre-authorization request message for a pending interaction, the method further comprising:
  after sending the second interaction authorization request message to the issuer electronic device, removing the second interaction from the account of the user after an expiration of a period of time.

15. One or more computer-readable non-transitory storage media including instructions that, when executed by one or more processors of a computing system, cause the one or more processors of the computing system to perform steps of:
  receiving, from a first electronic device, first interaction information for a first interaction between a user and an online entity;
  generating a first interaction authorization request message in a pre-determined authorization request message format based on the first interaction information;
  sending, via a communication channel between the computing system and an issuer electronic device associated with an issuer of an account of the user, the first interaction authorization request message to the issuer electronic device;
  receiving, via the communications channel from the issuer electronic device, a first interaction authorization response message in a pre-determined authorization response message format;
  determining that the first interaction authorization response message indicates approval of the first interaction;
  generating instructions for the issuer electronic device to repurpose a first field by replacing an interaction code with a predefined message that comprises information that is different than online entity information, wherein the interaction code is configured to represent to the issuer electronic device that the predefined message corresponds to the first field;
  generating, despite the first interaction authorization message indicating approval of the first interaction, a second interaction authorization request message in the pre-determined authorization request message format, wherein the second interaction authorization request message in the pre-determined authorization request message format comprises the first field that includes the instructions generated by the computing system; and sending, via the communication channel, the second interaction authorization request message to the issuer electronic device to instruct the issuer electronic device to replace content of the first field with the predefined message.

16. The storage media of claim 15, wherein the first interaction authorization request message comprises data identifying the online entity in the first field.

17. The storage media of claim 15, wherein the second interaction authorization request message comprises data representing a notification of potential fraud on the account of the user.

18. A computing system comprising: one or more processors; and one or more computer-readable non-transitory storage media in communication with the one or more processors and comprising instructions that, when executed by the one or more processors cause the computing system to perform steps of:
    receiving, from a first electronic device, first interaction information for a first interaction between a user and an online entity;
    generating a first interaction authorization request message in a pre-determined authorization request message format based on the first interaction information;
    sending, via a communication channel between the computing system and an issuer electronic device associated with an issuer of an account of the user, the first interaction authorization request message to the issuer electronic device;
    receiving, via the communications channel from the issuer electronic device, a first interaction authorization response message in a pre-determined authorization response message format;
    determining that the first interaction authorization response message indicates approval of the first interaction;
    generating instructions for the issuer electronic device to repurpose a first field by replacing an interaction code with a predefined message that comprises information that is different than online entity information, wherein the interaction code is configured to represent to the issuer electronic device that the predefined message corresponds to the first field;
    generating, despite the first interaction authorization message indicating approval of the first interaction, a second interaction authorization request message in the pre-determined authorization request message format, wherein the second interaction authorization request message in the pre-determined authorization request message format comprises the first field that includes the instructions generated by the computing system; and
    sending, via the communication channel, the second interaction authorization request message to the issuer electronic device to instruct the issuer electronic device to replace content of the first field with the predefined message.

19. The computing system of claim 18, wherein the first interaction authorization request message comprises information regarding the online entity in the first field.

20. The computing system of claim 18, wherein the second interaction authorization request message comprises data representing a notification of potential fraud on the account of the user.

* * * * *